(12) United States Patent
Jang et al.

(10) Patent No.: US 9,606,413 B2
(45) Date of Patent: Mar. 28, 2017

(54) REFLECTIVE DISPLAY PARTICLE, REFLECTIVE DISPLAY DEVICE, AND METHOD FOR MANUFACTURING THE SAME

(71) Applicant: NANOBRICK CO., LTD., Suwon-si (KR)

(72) Inventors: Boseung Jang, Suwon-si (KR); Seunghun Han, Suwon-si (KR); Jaehyun Joo, Suwon-si (KR)

(73) Assignee: NANOBRICK CO., LTD., Suwon-si (KR)

( * ) Notice: Subject to any disclaimer, the term of this patent is extended or adjusted under 35 U.S.C. 154(b) by 3 days.

(21) Appl. No.: 14/719,498

(22) Filed: May 22, 2015

(65) Prior Publication Data

US 2015/0338716 A1    Nov. 26, 2015

(30) Foreign Application Priority Data

May 26, 2014   (KR) .................. 10-2014-0063324

(51) Int. Cl.
| | | |
|---|---|---|
| G02B 26/00 | (2006.01) | |
| G02B 26/08 | (2006.01) | |
| G02F 1/29 | (2006.01) | |
| G02F 1/167 | (2006.01) | |
| B01J 13/18 | (2006.01) | |
| G02B 26/02 | (2006.01) | |

(52) U.S. Cl.
CPC .............. G02F 1/167 (2013.01); B01J 13/18 (2013.01); B01J 13/185 (2013.01); G02B 26/026 (2013.01)

(58) Field of Classification Search
USPC ........ 359/237, 242, 251–254, 267, 290–296, 359/298
See application file for complete search history.

(56) References Cited

FOREIGN PATENT DOCUMENTS

| KR | 1020120137337 | 12/2012 |
|---|---|---|
| WO | 2011093323 | 8/2011 |

*Primary Examiner* — Joseph P Martinez
*Assistant Examiner* — Brandi Thomas
(74) *Attorney, Agent, or Firm* — Cantor Colburn LLP

(57) ABSTRACT

Provided is a method for manufacturing a reflective display particle, the method including: (a) preparing first and second dispersion solutions by dispersing first and second reflective display materials that reflect light in different wavelength ranges into first and second media that contain a curable material and are unmixed with each other, respectively; (b) forming an emulsion by mixing the prepared first and second dispersion solutions, and encapsulating the emulsion into a capsule; and (c) having the first and second dispersion solutions contained in the encapsulated emulsion undergo phase separation, and curing the phase-separated first and second dispersion solutions by applying energy to the phase-separated first and second dispersion solutions.

6 Claims, 4 Drawing Sheets

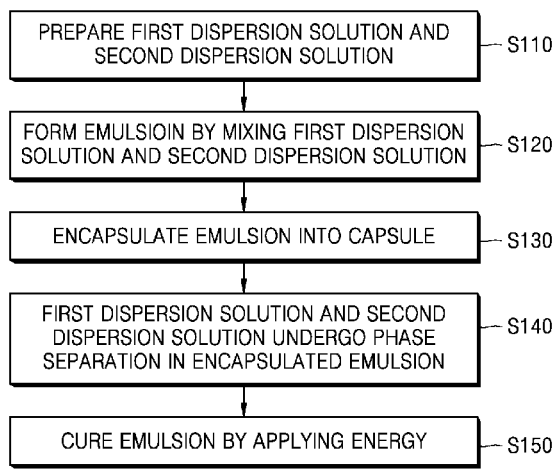
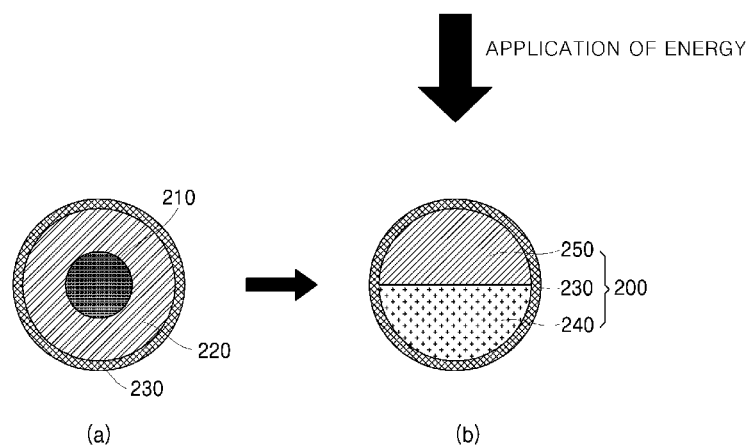

REFLECTIVE DISPLAY PARTICLE, REFLECTIVE DISPLAY DEVICE, AND METHOD FOR MANUFACTURING THE SAME

BACKGROUND

1. Field

The present invention relates to a reflective display particle, a reflective display device, and a method for manufacturing the same, and more specifically, to a method for manufacturing a reflective display particle, the method including: (a) preparing first and second dispersion solutions by dispersing first and second reflective display materials that reflect light in different wavelength ranges into first and second media that contain a curable material and are unmixed with each other, respectively; (b) forming an emulsion by mixing the prepared first and second dispersion solutions, and encapsulating the emulsion into a capsule; and (c) having the first and second dispersion solutions contained in the encapsulated emulsion undergo phase separation, and curing the phase-separated first and second dispersion solutions by applying energy to the phase-separated first and second dispersion solutions.

2. Description of the Prior Art

Various conventional arts with reference to a reflective display device have been introduced.

Like an electrophoretic display (EPD) technology by E-Ink Inc., a representative example is a technology that is capable of applying an electric field to a particle having an inherent color and charge such that the particle moves along the direction of the electric field applied, thereby displaying the inherent color of the particle.

Recently introduced is a technology that is capable of applying an electric field to a particle having distinct parts and two or more colors (so called, a Janus particle) such that the particle moves or rotates, thereby selectively displaying the two or more colors of the particle.

The aforementioned reflective display device has the advantage of being widely applicable in various fields because of a relatively simple structure compared with conventional display devices, such as LCD and LED, and low power consumption.

However, the manufacturing process of a reflective display particle (especially, a Janus particle having two or more colors on a surface thereof and being rotatable) that is used in the aforementioned reflective display device is so complex, and a subsequent manufacturing process of a reflective display device that includes the reflective display particle so time-consuming and costly, that it is difficult to mass-produce or commercialize a reflective display device.

SUMMARY

The present invention has been made to solve the above-mentioned problems occurring in the prior art, and an aspect of the present invention is to provide a method for manufacturing a reflective display particle, the method including: preparing first and second dispersion solutions by dispersing first and second reflective display materials that reflect light within different wavelength ranges into first and second media that contain a curable material and are unmixed with each other, respectively; forming an emulsion by mixing the prepared first and second dispersion solutions, and encapsulating the emulsion into a capsule; and having the first and second dispersion solutions contained in the encapsulated emulsion undergo phase separation, and curing the phase-separated first and second dispersion solutions by applying energy to the phase-separated first and second dispersion solutions.

In order to accomplish these objects, there is provided a method for manufacturing a reflective display particle, the method including: (a) preparing first and second dispersion solutions by dispersing first and second reflective display materials that reflecting lights in within different wavelength bandwavelength ranges into first and second media which that contain a curable material and are unmixed with each other, respectively; (b) forming an emulsion by mixing the prepared first and second dispersion solutions to form an emulsion, and encapsulating the emulsion into a capsule; and (c) having phase-separating the first and second dispersion solutions contained in the encapsulated emulsion undergo phase separation, and applying energy to curing the phase-separated first and second dispersion solutions to cure by applying energy to the phase-separated first and second dispersion solutions.

The first and second dispersion solutions may include materials having magnetisms of different polarities.

The first and second dispersion solutions may include materials having electric charges of different polarities.

In accordance with another aspect of the present invention, there is provided a method for manufacturing a reflective display device, the method including: (a) preparing a reflective display particle dispersion by dispersing the reflective display particles manufactured by the method of claim 1 in an internal solvent; and (b) forming an emulsion by mixing an external solvent that includes a curable material with the prepared reflective display particle dispersion, and curing the external solvent by applying energy to the emulsion.

The internal solvent may be an organic solvent and the external solvent may be an aqueous solvent.

Here, the reflective display particles maintain a state of being freely movable or rotatable in the internal solvent, even after the external solvent is cured.

In accordance with still another aspect of the present invention, there is provided a reflective display particle, including: a first region including a first reflective display material that reflects light in a first wavelength range; a second region including a second reflective display material that reflects light in a second wavelength range; and a capsule encapsulating the first region and the second region, wherein the first region and the second region are formed by curing thereof in response to applied energy, and wherein the first region and the second region have electric charges of different polarities or magnetisms of different polarities.

In accordance with still another aspect of the present invention, there is provided a reflective display device, including: reflective display particles, each particle including a first region including a first reflective display material that reflects light in a first wavelength range, a second region including a second reflective display material that reflects light in a second wavelength range, and a capsule encapsulating the first region and the second region, wherein the first region and the second region are formed by curing thereof in response to applied energy, and the first region and the second region have electric charges of different polarities or magnetisms of different polarities; an internal solvent in which the reflective display particles are dispersed in a state of being freely movable or rotatable; and a cured region surrounding the internal solvent.

The reflective display particles may include first and second reflective display particles having different threshold voltages, the first and second reflective display particles may not move or rotate when an electric or magnetic field having intensity smaller than the threshold voltages of the first and second reflective display particles is applied, and may move or rotate when an electric or magnetic field having intensity greater than the threshold voltages of the first and second reflective display particles is applied.

As set forth above, reflective display particles having two or more inherent colors and capable of being moved or rotated by an electric field or a magnetic field can be promptly and easily manufactured. Furthermore, a reflective display device capable of displaying various colors using the reflective display particles can be provided.

BRIEF DESCRIPTION OF THE DRAWINGS

The above and other objects, features and advantages of the present invention will be more apparent from the following detailed description taken in conjunction with the accompanying drawings, in which:

FIG. 1 sequentially shows a process for manufacturing reflective display particles according to an embodiment of the present invention;

FIG. 2 illustratively shows a method for manufacturing reflective display particles according to an embodiment of the present invention.

DETAILED DESCRIPTION

Figure 3:
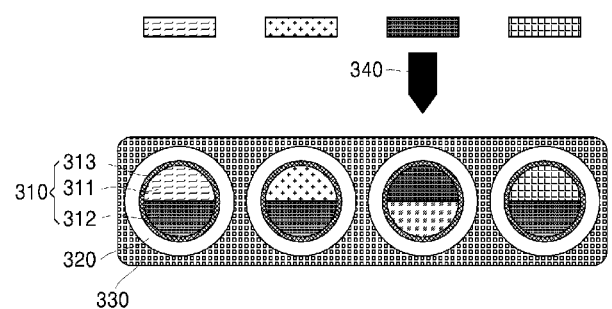
FIGS. 3 to 7 illustratively show the structures of reflective display particles and a reflective display device including the same according to an embodiment of the present invention.

Hereinafter, a specific embodiment of the present disclosure which may be carried out will be exemplarily described in detail with reference to the accompanying drawings. The embodiments will be sufficiently described in detail such that those skilled in the art may carry out the present disclosure. It should be understood that although various embodiments of the present invention are different from each other, they need not be mutually exclusive. For example, with relation to an embodiment, specific forms, structures, and characteristics described herein may be implemented through another embodiment without departing from the spirit and scope of the present disclosure. Moreover, it should be understood that locations or arrangements of separate elements within the disclosed embodiments can be changed without departing from the spirit and scope of the present invention. Accordingly, the detailed descriptions which will be given below are not intended to be restrictive, and the scope of the present disclosure, if properly described, should be limited only by the accompanying claims and equivalents thereof. Similar reference numerals shown in the drawings denote members performing an identical or similar function in several aspects.

Hereinafter, a method for manufacturing a capsule according to the present invention will be described in detail with reference to the accompanying drawings, so that those skilled in the art can easily carry out the present invention.

FIG. 1 sequentially shows a process for manufacturing reflective display particles according to an embodiment of the present invention.

First, according to an embodiment of the present invention, first and second dispersion solutions may be prepared by dispersing first and second reflective display materials that reflect light within different wavelength ranges into first and second media that contain a curable material and are immiscible with each other, respectively (S110 in FIG. 1).

Particularly, according to an embodiment of the present invention, the first reflective display material and the second reflective display material, which are dispersed in the first dispersion solution and the second dispersion solution, may be particles processed (or coated) with a color-forming material with an inherent color, such as a dye or a pigment. For example, the reflective display material according to an embodiment of the present invention may include a material comprising an element, such as iron (Fe) nickel (Ni), cobalt (Co), titanium (Ti), carbon (C), zinc (Zn), sulfur (S), gold (Au), silver (Ag), barium (Ba), strontium (Sr), lead (Pb), aluminum (Al), tungsten (W), or molybdenum (Mo), or an oxide thereof. Furthermore, the reflective display material according to an embodiment of the present invention may include a particle whose surface is processed (coated) with a dye or a pigment, a particle whose surface is processed (coated) with an organic compound, a particle whose surface is processed (coated) with a complex compound, a particle whose surface is processed (coated) with a coordination compound, and the like.

For example, the dye contained in the reflective display material according to an embodiment of the present invention may include an azo dye, an anthraquinone dye, a carbonium dye, an indigo dye, a sulfide dye, a phthalocyanine dye, and the like. Furthermore, the pigment contained in the reflective display material according to an embodiment of the present invention may include inorganic pigments, such as titanium dioxide, zinc oxide, lithopone, zinc sulfonate, carbon black, graphite, chrome yellow, a fluorescent pigment, and a pearl pigment, or organic pigments, such as insoluble azo-based pigments, soluble azo-based pigments, phthalocyanine-based pigments, quinacridone-based pigments, dioxazine-based pigments, isoindolinone-based pigments, dry vat dyes, quinophthalone-based pigments, and metal complex pigments.

In addition, according to an embodiment of the present invention, the first medium and the second medium may include water, methanol, ethanol, propanol, butanol, propylene carbonate, toluene, benzene, hexane, chloroform, isoparaffin oil, silicone oil, ester-based oil, hydrocarbon-based oil, triethylhexanoin, dimethicone, cetyl octanoate, dicaprylate, isopropyl myristate, tocopherol acetate, and the like.

Furthermore, according to an embodiment of the present invention, the curable material contained in the first dispersion solution and the second dispersion solution can be cured by energy applied from the outside. The curable material may include a UV curable material, a high-temperature curable material, a low-temperature curable material, and the like, and the curable material may include a solid content in the range of about 10 wt % to about 100 wt %.

Particularly, according to an embodiment of the present invention, the first dispersion solution and the second dispersion solution may respectively include materials having magnetisms of different polarities or electric charges of different polarities. Specifically, the foregoing first reflective display material and second reflective display material may have magnetism of different polarities or electric charges of different polarities. As will be described later, the first dispersion solution and the second dispersion solution respectively have magnetism of different polarities or electric charges of different polarities, and therefore it is possible to move or rotate the reflective display particles by applying a magnetic field or an electric field thereto.

Then, according to an embodiment of the present invention, an emulsion may be formed by mixing the above prepared first dispersion solution and second dispersion solution (S120).

Particularly, according to an embodiment of the present invention, the diameter of the droplets in the emulsion may be in the range of about 1 µm to about 1000 µm, and may be adjusted depending on factors such as the mixing ratio of the first dispersion solution and the second dispersion solution, the stirring rate, the amount of surfactant, and the like.

In addition, according to an embodiment of the present invention, the surfactant may be included on boundary surfaces between the first dispersion solution and the second dispersion solution that constitute the emulsion, and therefore the emulsion may be maintained in a stable state with the first dispersion solution and the second dispersion solution separated from each other along boundary lines. For example, the surfactant may be one of an anionic surfactant, a cationic surfactant, a nonionic surfactant, an amphoteric surfactant, and a zwitterionic surfactant. Particularly, according to an embodiment of the present invention, the surfactant may be contained in the range of about 0.01 wt % to about 10 wt %, based on the total weight of the emulsion.

Then, according to an embodiment of the present invention, the above formed emulsion may be encapsulated into a capsule (S130).

Particularly, according to an embodiment of the present invention, the capsule that encapsulates the emulsion may be made of a light-transmissive polymeric material. For example, alginate, gelatin, ethyl cellulose, polyamide, melamine formaldehyde, poly(vinyl pyridine), polystyrene, urethane, polyurethane, methyl methacrylate, and the like may be included in the capsule. Furthermore, according to an embodiment of the present invention, the capsule that encapsulates the emulsion may be formed by methods such as emulsion polymerization, multi-stage emulsion polymerization, condensation polymerization, solvent extraction and evaporation, suspension cross-linking method, coacervation, extrusion, spraying, or the like, and may be cured under high-temperature conditions, low-temperature conditions, ionic conditions, or the like. The capsule may retain softness or hardness properties depending on the concentration or kind of polymers included in the capsule.

Then, according to an embodiment of the present invention, the first dispersion solution and the second dispersion solution contained in the encapsulated emulsion undergo phase separation so that a region in which the first dispersion solution is present and a region in which the second dispersion solution is present are distinct from each other in the encapsulated emulsion (S140). For example, the encapsulated emulsion has a spherical shape and the first dispersion solution and the second dispersion solution may undergo phase separation such that the first dispersion solution is present in a semi-spherical region and the second dispersion solution is present in the other semi-spherical region.

Then, according to an embodiment of the present invention, the first dispersion solution and the second dispersion solution are cured by applying energy, such as UV or heat, to the above phase-separated emulsion, thereby manufacturing a reflective display particle divided into a first region that is formed as a result of curing the first dispersion solution and a second region that is formed as a result of curing the second dispersion solution (S150).

FIG. 2 illustratively shows a method for manufacturing reflective display particles according to an embodiment of the present invention.

Referring to FIG. 2, an emulsion comprising a first dispersion solution 210 and a second dispersion solution 220 is encapsulated in a capsule 230 (see (a) of FIG. 2). Then, the first dispersion solution 210 and the second dispersion solution 220 in the capsule undergo phase separation, and then energy is applied thereto, thereby manufacturing a reflective display particle 200 divided into a first region 240 and a second region 250. The first region 240 reflects a first color by a first reflective display material contained in the first dispersion solution 210 and the second region 250 reflects a second color by a second reflective display material contained in the second dispersion solution 220 (see (b) of FIG. 2).

Meanwhile, according to an embodiment of the present invention, the reflective display particles manufactured by the aforementioned manufacturing method may be dispersed into an organic solvent, thereby forming an organic dispersion. The above-formed organic dispersion may be mixed with an aqueous solvent that includes a curable material, thereby forming another emulsion. Then, energy is applied to another emulsion formed as described above to cure the aqueous solvent, thereby manufacturing a film type reflective display device. Therefore, the reflective display particles may be dispersed in a fluid-state organic solvent that is not cured, within the film type reflective display device that is surrounded by cured regions formed as a result of curing the aqueous solvent. Thus, the reflective display particles may maintain a state of being freely rotatable and therefore the movement or rotation of the reflective display particles may be controlled by applying an electric field or a magnetic field to the film type reflective display device.

Figure 7:
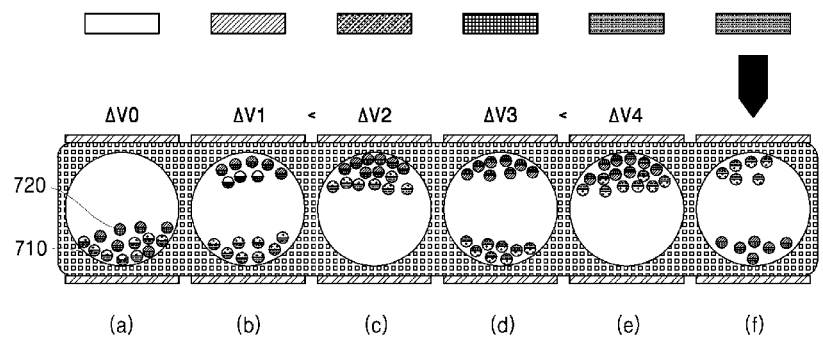

FIGS. 3 and 7 illustratively show the structures of reflective display particles and a reflective display device including the same according to an embodiment of the present invention.

Figure 4:
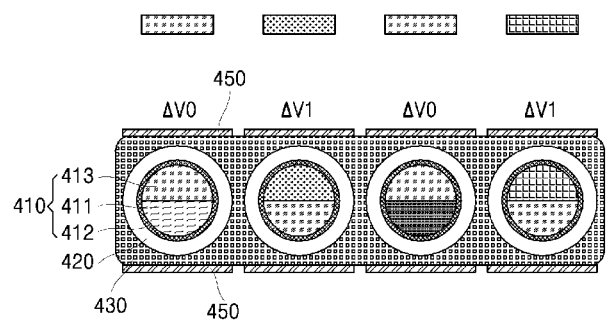

First, referring to FIGS. 3 and 4, reflective display devices 300 and 400 according to embodiments of the present invention may include reflective display particles 310 and 410. The reflective display particles 310 and 410 include first regions 311 and 411 having electric charges or magnetism and reflecting light in a first wavelength range (that is, having a first color) and second regions 312 and 412 having electric charges and magnetism with opposite polarities to the first regions and reflecting light in a second wavelength range (that is, having a second color), and maintain a state of being dispersed in fluids 320 and 420 while encapsulated into capsules 313 and 413. According to embodiments of the present invention, the reflective display particles 310 and 410 may be moved or rotated by applying an electric field or a magnetic field to the reflective display particles 310 and 410 such that the first color of the first regions 311 and 411 or the second color of the second regions 312 and 412 of the reflective display particles 310 and 410 may be selectively displayed.

Figure 5:
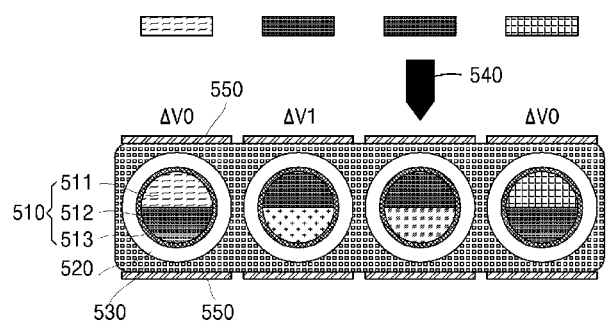

Next, referring to FIG. 5, an electric field and a magnetic field are sequentially or simultaneously applied to reflective display device 500 that includes the reflective display particles 510 having both electric charges and magnetism, thereby moving or rotating the reflective display particles 510, such that a first color of a first region 511 or a second color of a second region 512 of the reflective display particles 510 may be selectively displayed. Particularly, according to an embodiment of the present invention, an electric field 550 is first applied to the whole display area of a reflective display device 500 such that the first color is displayed across the whole display area of the reflective display device 500, and then a magnetic field 540 is locally applied such that the second color is displayed only on an area to which the magnetic field is applied. In the manner illustratively described above, various display states can be achieved.

Figure 6:
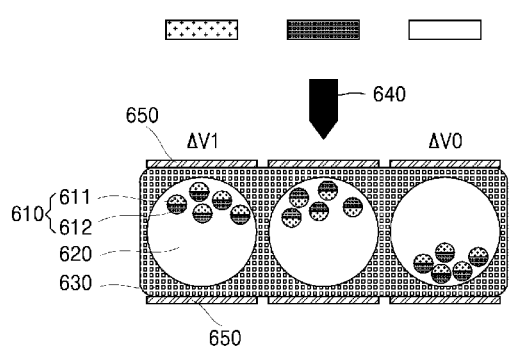

Next, referring to FIG. 6, an electric field and a magnetic field are sequentially or simultaneously applied to reflective display device 600 that includes the reflective display particles 610 having both electric charges and magnetism, thereby moving or rotating the reflective display particles 610 dispersed in a fluid 620, such that a first color of a first region 611 or a second color of a second region 612 of the reflective display particles 610 may be selectively displayed. Particularly, according to an embodiment of the present invention, an electric field 650 is first applied to the reflective display device 600. Then, the reflective display particles 610 that are present in an area to which the electric field is applied are rotated following a direction of the electric field and then moved toward a display surface. Therefore, the first color of the first regions 611 of the reflective display particles 610 may be displayed. Then, a magnetic field 640 is applied to part of the area to which the electric field has been applied such that the reflective display particles 610 that are present in the part of the area to which the magnetic field is applied, are rotated in the opposite direction following a direction of the magnetic field. Therefore, the second color of the second regions 612 of the reflective display particles 610 may be displayed on the part of the area to which the magnetic field is applied.

Meanwhile, according to an embodiment of the present invention, the reflective display particles included in the reflective display device may have a predetermined threshold voltage (Vth) with respect to the electric field or magnetic field that is applied. That is, when an electric field or magnetic field having intensity smaller than the threshold voltage is applied to the reflective display particle, the reflective display particle does not move or rotate. However, when an electric field or magnetic field having greater intensity than the threshold voltage is applied to the reflective display particle, the reflective display particle may move or rotate.

Furthermore, according to an embodiment of the present invention, at least one reflective display particle included in the reflective display deice may have different threshold voltages with respect to the magnetic field or electric field. That is, even when an electric field or a magnetic field having the same intensity is applied, reflective display particles having a low threshold voltage rotate or move while reflective display particles having a high threshold voltage may not rotate or move.

Therefore, according to an embodiment of the present invention, when a plurality of reflective display particles included in the reflective display device have different threshold voltages with respect to an electric field or a magnetic field, the rotation or movement of the plurality of reflective display particles may be respectively controlled by adjusting the intensity, direction, duration of application, frequency of application, or the like of the electric field or magnetic field. For example, the saturation or grayscale tones of the displayed color may be adjusted by controlling the degree of rotation of the reflective display particles.

Next, referring to FIG. 7, a reflective display device 700 may include first reflective display particles 710 and second reflective display particles 720 having different threshold voltages. The threshold voltage of the first reflective display particles 710 may be higher than that of the second reflective display particles 720.

Particularly, according to an embodiment of the present invention, when an electric field having intensity smaller than the threshold voltage of the second reflective display particles 720 is applied, none of the first reflective display particles 710 and the second reflective display particles 720 may move or rotate (see (a) of FIG. 7). When an electric field having intensity greater than the threshold voltage of the second reflective display particles 720 but smaller than the threshold voltage of the first reflective display particle 710 is applied, only the second reflective display particles 720 may move and rotate toward the display surface (see (b) of FIG. 7). When an electric field having intensity greater than the threshold voltage of the first reflective display particle 710 is applied, both the first reflective display particles 710 and the second reflective display particles 720 may move and rotate toward the display surface (see (c) of FIG. 7).

In addition, according to an embodiment of the present invention, when an electric field having intensity greater than the threshold voltage of the second reflective display particle 720 but smaller than the threshold voltage of the first reflective display particle 710 is applied in the opposite direction, only the second reflective display particles 720 move toward the display surface in response to the electric field and may rotate in a direction opposite to the direction in (b) of FIG. 7 (see (d) of FIG. 7). When an electric field having intensity greater than the threshold voltage of the first reflective display particles 710 is applied in the opposite direction, both the first reflective display particles 710 and the second reflective display particles 720 move toward the display surface and may rotate in a direction opposite to the direction in (c) of FIG. 7 (see (e) of FIG. 7).

Meanwhile, according to an embodiment of the present invention, the first reflective display particles 710 may have magnetism while the second reflective display particles 720 may not have magnetism. Therefore, when a magnetic field is applied, only the first reflective display particles 710 may move and rotate toward the display surface (see (f) of FIG. 7).

As described above, although the present invention has been described through the specific matters such as detailed elements, the limited embodiments, and the drawings, they are provided to help overall comprehension of the present invention, and the present invention is not limited to the above-described embodiments. It is obvious to those skilled in the art to which the present invention pertains that various changes and modifications can be made from such descriptions as described above.

Accordingly, the spirit and scope of the present invention should not be limited or determined by the above-described embodiments, and it should be noted that not only the claims which will be described below but also their equivalents fall within the spirit and scope of the present invention.

What is claimed is:

1. A method for manufacturing a reflective display particle, the method comprising:
   (a) preparing first and second dispersion solutions by dispersing first and second reflective display materials that reflect light within different wavelength ranges into first and second media that contain a curable material and are unmixed with each other, respectively;
   (b) forming an emulsion by mixing the prepared first and second dispersion solutions, and encapsulating the emulsion into a capsule; and
   (c) having the first and second dispersion solutions contained in the encapsulated emulsion undergo phase separation, and curing the phase-separated first and second dispersion solutions by applying energy to the phase-separated first and second dispersion solutions.

2. The method of claim 1, wherein the first and second dispersion solutions include materials having magnetisms of different polarities.

3. The method of claim 1, wherein the first and second dispersion solutions include materials having electric charges of different polarities.

4. A method for manufacturing a reflective display device, the method comprising:
   (a) preparing a reflective display particle dispersion by dispersing the reflective display particles manufactured by the method of claim 1 into an internal solvent; and
   (b) forming an emulsion by mixing an external solvent that includes a curable material with the prepared reflective display particle dispersion, and curing the external solvent by applying energy to the emulsion.

5. The method of claim 4, wherein the internal solvent is an organic solvent and the external solvent is an aqueous solvent.

6. The method of claim 4, wherein the reflective display particles maintain a state of being freely movable or rotatable in the internal solvent, even after the external solvent is cured.

* * * * *